Jan. 25, 1966 A. D. CALABRO 3,231,785
CIRCUIT BOARD MOUNTING DEVICE
Filed Aug. 12, 1963

Anthony D. Calabro
INVENTOR.

BY *Clarence A. O'Brien*
*and Harvey B. Jacobson*
Attorneys 3,231,785
CIRCUIT BOARD MOUNTING DEVICE
Anthony D. Calabro, 8738 West Chester Pike,
Upper Darby, Pa.
Filed Aug. 12, 1963, Ser. No. 301,581
10 Claims. (Cl. 317—100)

This invention relates to the mounting and fastening of modular panels, boards or cards which in turn mount circuits such as printed circuits, within a panel rack or cage utilized in connection with electronic equipment or the like.

The mounting and locking of the aforementioned panels within panel receiving racks or cages, has heretofore been accomplished by use of fastener brackets and fastener elements which have involved the assembly of a plurality of parts and required tools and considerable manipulation thereof for securing the panels in place by means of tracks and fasteners such as rivets. It is therefore a primary object of the present invention to provide single integrally moulded elements which may be merely snapped into place in order to secure the aforementioned panels within their rack or cage mounting.

Another object of the present invention is to provide a panel mounting element adapted to be secured to a panel receiving rack or cage without the use of any additional fastener elements or fastening tools in order to hold in place, panel boards of varying thicknesses.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
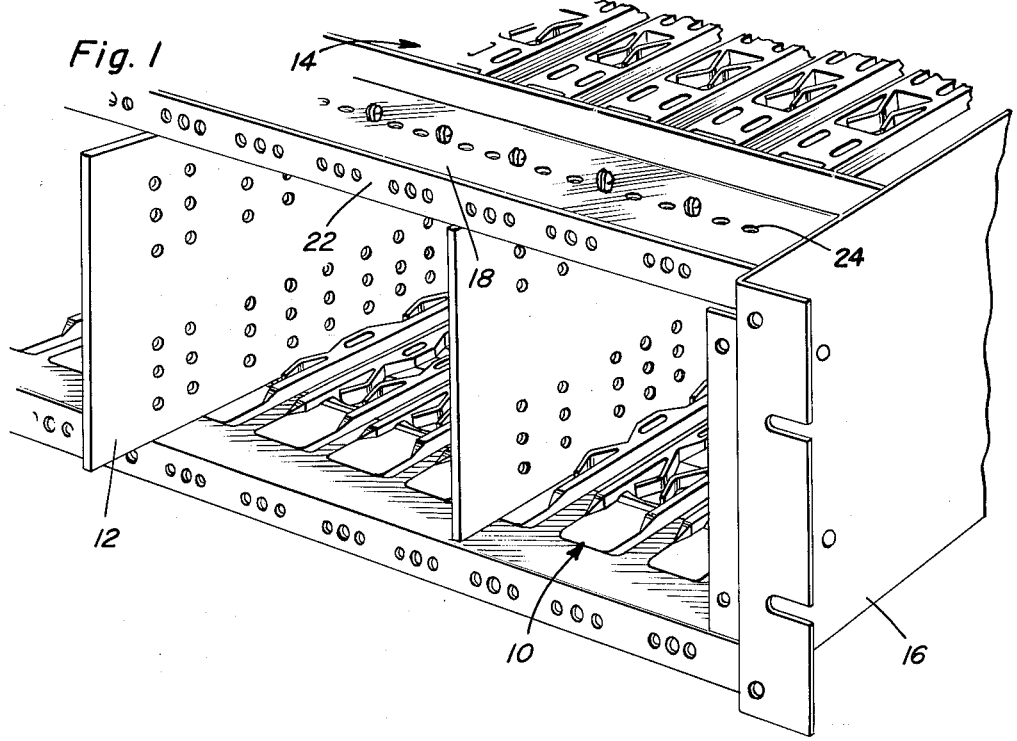
FIGURE 1 is a perspective view of a typical installation for circuit board mounting devices made in accordance with the present invention.

Referring now to the drawings in detail, it will be observed that a plurality of mounting devices 10 of one form may be utilized in connection with panels or circuit boards 12 supported within a rack or cage generally referred to by reference numeral 14. The cage 14 is of the type which is constructed from end plate members 16 interconnected by parallel spaced channel members 18 to which parallel spaced tracks are usually secured for receiving and holding the panel boards 12 in parallel spaced relation to each other. The panels 12 are therefore inserted into the cage from one side between the parallel spaced channels 18. Accordingly, the opening in the cage into which the panels 12 are inserted, is defined between the parallel spaced flanges 22. The channel webs are ordinarily provided with a plurality of spaced apertures 24 by means of which special metallic tracks are secured by rivets or other fastener elements to firmly hold the panels in spaced parallel relation within the cage. However, in accordance with the present invention, the devices 10 are utilized as the track elements and are snapped into place gripping the sides of the panels. Each of the devices 10 therefore, is integrally moulded from a non-conductive, plastic material and is provided with fastener facilities which project through the apertures 24 so that the aligned track devices 10 may be secured to the cage on opposite sides thereof bridging the channels 18 for guidingly receiving and gripping the panels.

Figure 2:
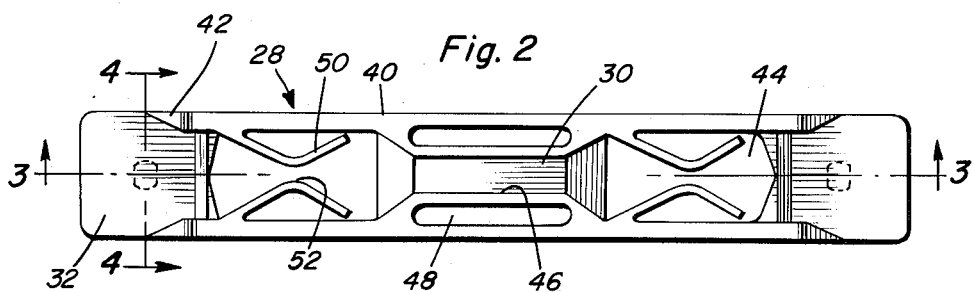
FIGURE 2 is a top plan view of one form of board mounting device.
Figure 3:
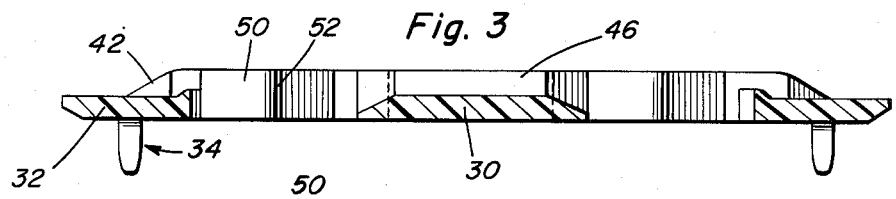
FIGURE 3 is a longitudinal sectional view taken substantially through a plane indicated by section line 3—3 in FIGURE 2.
Figure 4:
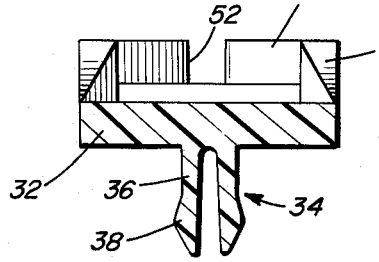
FIGURE 4 is a transverse sectional view taken substantially through a plane indicated by section line 4—4 in FIGURE 2.

The length of the mounting device 10 will therefore be determined by the spacing between the side forming channel elements 18 of the panel mounting rack or cage. Also, in the exemplary embodiment illustrated in FIGURE 1, the mounting device 10 is designed to grip portions of the panel 12 with which it is associated at spaced locations. It will therefore be appreciated, that the length of the mounting devices may be varied in accordance with the installation and panel length for which the mounting device is designed. One form of a mounting device illustrated in FIGURES 2, 3 and 4 is designed to be associated with a smaller panel and is generally referred to by reference numeral 28. It will be observed, that the mounting device 28 consists of an elongated member having a relatively flat base portion 30 of a predetermined thickness presenting a slide bearing surface for sliding contact with the side edges of the panels 12. The base portion terminates at opposite longitudinal ends in relatively thinner end tab portions 32. The tab portions 32 are adapted to overlie the spaced side-forming channel elements of the panel mounting cage with which the device is associated. Projecting from one side of the end portions 32, are contractible fastener elements 34 consisting of a pair of prongs 36 having enlarged portions 38 as more clearly seen in FIGURE 4. The fastener elements may therefore be inserted into the fastener apertures associated with the spaced channels 18 of the cage causing the prongs 36 to be deflected toward each other so as to pass through the aperture after which they expand to lock the mounting device to the cage bridging the spaced channels.

Connected to the base portion of the elongated member are relatively thin parallel spaced channel forming walls 40 which project from the base portion perpendicular thereto and extend longitudinally between the channels 18. The walls 40 resist bending of the mounting device and therefore terminate at tapered portions 42 beyond which the tab portions 32 extend. The side wall members 40 thereby render the mounting device rigid despite the provision of spaced openings 44 in the base portion thereof between the end tab portions 32 whereby sliding contact is reduced and provision made for panel gripping means. Also, the wall members 40 are provided with relatively thicker portions 46 between the spaced openings 44 so as to form a relatively rigid track. Through the thickened portions 46 of the wall members, extend ventilation slots 48 by means of which free circulation of air is permitted over the panel boards. The openings 44 in the mounting devices therefore receive the resilient gripping means for holding the panel boards in place, the resilient gripping means extending into the spaced openings 44 in one direction so as to permit insertion of the panels from one open side of the cage.

The resilient gripping means consist of bent resilient finger elements 50 which are connected to the side walls the finger elements extend toward each other into the openings 44 so as to present gripping contact portions 52 in close spaced adjacency to each other centrally within the openings forming a laterally expansible track. In this manner, the flexible finger elements 50 will accommodate panel boards of different thicknesses.

From the foregoing description, the construction and utility of the circuit board mounting device of the present invention will be apparent. It will therefore be appreciated, that the moulded article forming the mounting device of the present invention is particularly useful in connection with the locking of circuit boards in place within cages or racks and may be constructed in varying lengths in accordance with different installational requirements. It will also be appreciated, that the flexible self adjusting snap fasteners associated with the mounting device will eliminate the use of additional fastening elements and the need for tools. Also, the provision of the flexible gripping fingers in the mounting device will accommodate boards of different thicknesses. Also, the article will have the requisite rigidity and will be provided with facilities for permitting ventilation of the circuit boards.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination with a circuit board panel and a panel mounting cage having parallel spaced side portions provided with fastener apertures, a panel mounting device comprising; an elongated track member bridging said side portions and having anchoring end portions, contractible fastener means secured to said end portions for insertion through the apertures in the side portions to secure the elongated member to the panel mounting cage, rigid side wall means connected to said elongated member for resisting bending thereof, said elongated member having sliding contact portions longitudinally spaced by openings formed in the elongated member, and flexible gripping means mounted on the side wall means and projecting into said spaced openings for engaging said board panel at spaced locations therealong.

2. The combination of claim 1 wherein said side wall means comprises a pair of relatively thin wall members having relatively thicker portions enclosing the sliding contact portions, said thicker portions being provided with ventilation slots extending therethrough.

3. The combination of claim 2, wherein said flexible gripping means comprises, finger elements extending from both of said wall members into close spaced adjacency to each other centrally of the spaced openings in the elongated member.

4. The combination of claim 1, wherein said flexible gripping means comprises, finger elements extending from said wall means into close spaced adjacency to each other centrally of the spaced openings in the elongated member.

5. A panel holding track device integrally formed from a non-conductive material comprising an elongated channel member having spaced side walls interconnected by a base portion, said base portion including at least one slide bearing surface on one side thereof between the side walls of the channel member and end tabs spaced from the slide bearing surface longitudinally projecting beyond the side walls, mounting means projecting from the tabs on the other side of the base portion, said side walls having thickened sections along the slide bearing surface to form a rigid track along which a panel board is in slidable contact with the slide bearing surface, and laterally deflectable gripping fingers projecting toward each other from said side walls into close spaced adjacency forming an expansible track aligned with said rigid track.

6. The article defined in claim 5, wherein said thickened sections of the side walls are provided with longitudinally elongated ventilation slots and said gripping fingers project from the side walls between the slide bearing surface and the end tabs.

7. The article defined in claim 6 wherein said gripping fingers are relatively flat elements bent to form longitudinally spaced grip contact surfaces.

8. The article defined in claim 5 wherein said gripping fingers are relatively flat elements integral with said side walls and bent to form longitudinally spaced grip contact surfaces.

9. A panel holding track device for a panel board comprising an elongated channel member having longitudinally spaced rigid track portions of reduced width slidably receiving the panel board, gripping means forming laterally expansible contact surfaces aligned with said rigid track portions for frictional contact with the panel board, said gripping means including spaced pairs of opposed fingers mounted within the channel member and extending longitudinally between the rigid track portions.

10. A holding track device for slidably receiving and frictionally holding a panel comprising an elongated channel member having rigid side walls, said side walls including thicker and thinner portions, a slide bearing portion interconnected between the thicker portions of the side walls and resilient grip means projecting from the thinner portions of the side walls to form a laterally expansible track in frictional contact with the panel board slidingly supported on the slide bearing portion, said channel member being formed with spaced openings between which the slide bearing portion is defined and said grip means including resilient fingers contacting the panel board at locations exposed through said openings in the channel member.

References Cited by the Examiner

UNITED STATES PATENTS

| 2,731,609 | 1/1956 | Sobel | 211—41 |
| 2,843,806 | 7/1958 | O'Neill | 174—15 X |
| 2,858,515 | 10/1958 | Thunander et al. | 317—101 X |
| 3,047,831 | 7/1962 | Majewski | 339—176 |
| 3,098,177 | 7/1963 | Bleier et al. | 339—17 X |
| 3,129,991 | 4/1964 | Schmitz | 339—17 |
| 3,130,351 | 4/1964 | Geil | 339—17 |

FOREIGN PATENTS 928,196 6/1963 Great Britain.

OTHER REFERENCES

Schuster "8 More Printed-Circuit Guides," advertisement published in Product Engineering Magazine, June 10, 1963, pp. 96 and 97.

JOHN F. BURNS, *Primary Examiner.*

LARAMIE E. ASKIN, *Examiner.*